United States Patent [19]

Ptacek et al.

[11] Patent Number: 5,653,292

[45] Date of Patent: Aug. 5, 1997

[54] METHOD AND APPARATUS FOR AUTOMATICALLY CONTROLLING THE SOIL PENETRATION DEPTH OF ZONE TILLAGE COULTERS AND THE LIKE

[75] Inventors: Timothy J. Ptacek; Dan J. Obenland, both of Salina; Thomas O. McGuire, Wichita; J. Michael McClure, Lindsborg, all of Kans.

[73] Assignee: Great Plains Manufacturing, Incorporated, Assaria, Kans.

[21] Appl. No.: 375,544

[22] Filed: Jan. 19, 1995

[51] Int. Cl.⁶ .................................................. F01B 25/26
[52] U.S. Cl. .............................. 172/4; 172/239; 172/310; 364/424.07; 56/10.2 E
[58] Field of Search ........................ 364/424.07; 172/4, 172/2, 239, 310; 56/10.2 D, 10.2 E

[56] References Cited

U.S. PATENT DOCUMENTS

| | | | |
|---|---|---|---|
| 3,749,035 | 7/1973 | Cayton et al. | 172/4 X |
| 4,037,519 | 7/1977 | Miller et al. | 172/4 X |
| 4,064,945 | 12/1977 | Haney | 172/4 |
| 4,120,364 | 10/1978 | Wooldridge | 172/4 X |
| 4,176,721 | 12/1979 | Poggemiller et al. | 172/4 |
| 4,221,266 | 9/1980 | Fardal | 172/4 |
| 4,355,688 | 10/1982 | Hamm et al. | 172/4 |
| 4,507,910 | 4/1985 | Thornley et al. | 56/10.2 E |
| 4,529,039 | 7/1985 | Sakundiak | 172/4 |
| 4,646,620 | 3/1987 | Buchl | 172/4 X |
| 4,913,070 | 4/1990 | Morrison, Jr. | 172/4 X |
| 5,234,060 | 8/1993 | Carter | 172/4 X |
| 5,261,495 | 11/1993 | Szymczak | 172/4 X |
| 5,359,836 | 11/1994 | Zeuner et al. | 56/10.2 E |
| 5,465,560 | 11/1995 | Panoushek et al. | 56/10.2 E |
| 5,469,694 | 11/1995 | Panousheck et al. | 56/10.2 E |
| 5,471,823 | 12/1995 | Panoushek et al. | 56/10.2 E |

*Primary Examiner*—Terry Lee Melius
*Assistant Examiner*—Christopher J. Novosad
*Attorney, Agent, or Firm*—Hovey, Williams, Timmons & Collins

[57] ABSTRACT

The zone tillage coulters on a drilling or planting implement are maintained at an essentially constant running depth by control apparatus that includes a programmed microprocessor-based controller and a hydraulic operating system that receives commands from the controller based upon inputs received from various sensors. One such sensor comprises a ground wheel which rides along the ground and swings up or down as changes in the terrain are encountered, such motions thus imparting voltage inputs to the controller which compares such inputs with previously selected data inputted by the operator. If the comparison results in a sufficiently large difference between the operator-selected data and the actual data coming from the sensor, the controller will cause a tongue cylinder to be actuated in the appropriate direction to buckle the tongue about a horizontal axis and thus either raise or lower the tongue and coulter gangs fastened thereto. Another sensor detects ground speed and inputs that information into the controller to influence the frequency of output pulses from the controller, while a third sensor detects when the machine is raised into its transport position at the end of a row so that coulters can be elevated to facilitate turn around of the machine. Adjustments can be made by the operator on the go, and manual override is also provided.

30 Claims, 7 Drawing Sheets

METHOD AND APPARATUS FOR AUTOMATICALLY CONTROLLING THE SOIL PENETRATION DEPTH OF ZONE TILLAGE COULTERS AND THE LIKE

TECHNICAL FIELD

This invention relates to the field of seed planting equipment, including both drills and planters, and more particularly, relates to depth control apparatus useful in connection with such equipment. The present invention is particularly useful for maintaining a consistent depth of penetration of coulters or other cutting devices used ahead of drills or planters in no-till, low-till, or similar heavy residue situations where it is necessary to slice through surface residue and prepare a starter slit in the soil in advance of the primary opener of the implement.

BACKGROUND

When planting or drilling where residue covers the intended seed bed, it is necessary to cut through such residue and initiate a tilled slice in the soil that is then entered and reshaped by the trailing opener, such as the double disk type, for deposit of seeds. It is important, however, that the initial slit made by the coulter or other device ahead of the opener be of consistent depth so that the seed which is deposited several feet behind the coulter is likewise deposited at the desired depth. If the coulter cuts too deeply, the seed when deposited by the opener may ultimately be buried more deeply than desired so as to delay emergence, or perhaps an air pocket could develop beneath the seed since the opener has its own gaging mechanism to cause it to deposit the seed at a selected depth.

On the other hand, if the slit made by the coulter is too shallow, the double disks of the opener may be unable to cut through the soil sufficiently to deepen the slit; consequently, the seed will lie closer to the surface than desired and may not be adequately protected against adverse weather elements. The problem of accurate seed placement is particularly compounded in such low tillage or no tillage situations because the soil itself has not been loosened and fluffed ahead of time in preparation for the movement therethrough of the opening disks or other seed placement structure.

In typical seed planting or drilling equipment, the ground wheels that support the frame which carries the slicing coulters are located a substantial distance behind the coulters themselves. Consequently, rises or falls in the terrain are encountered first by the coulters, and only later by the ground wheels. Consequently, the ground wheels are not responsive soon enough to terrain changes to adjust the height of the frame. By the time the terrain change is experienced by the ground wheels, it may be too late to raise or lower the coulters; in fact, changing the coulter depth at that point may actually move the coulters in the wrong direction.

What is needed is a means of making the frame responsive to changes encountered by the coulters themselves at the time such changes are encountered, rather than relying upon the trailing support wheels to do that job.

SUMMARY OF THE DISCLOSURE

Accordingly, one important object of the present invention is to provide a depth control apparatus for coulter gangs and other tools that is able to maintain the coulters running at an essentially consistent or constant depth in the ground despite changes in the contour of the ground and variations in the nature and hardness or softness of the soil being encountered. An important object in this respect is to make the system ignore variation in soil types, moisture levels and density while being immediately and accurately responsive to terrain changes about to be encountered by the coulters.

These and other important objects are accomplished in the present invention by sensing the terrain at or slightly ahead of the coulters to determine whether such terrain will cause the coulters, if not adjusted, to cut more deeply or less deeply into the upcoming terrain than desired. The information detected about the terrain is compared with a pre-established standard or desired piece of depth information selected by the operator ahead of time; if there is a variance or difference between the two values, appropriate adjustment is caused to occur. In the preferred embodiment, the coulters are rigidly or fixedly carried on the wheel-supported frame, and the tongue of the frame is hinged about a horizontal pivot so that a buckling action occurs at such pivot via a hydraulic power device to thus raise or lower the coulters by the appropriate amount. In its preferred form, the invention also includes a microprocessor—based controller that receives data from the terrain sensor and compares it with the pre-set standard depth information selected by the operator, thereupon causing actuation of the hydraulic cylinder device if the variance between the two bits of information is large enough.

Pulses generated by the controller occur at substantially regular intervals, but the duration of the pulses which actuate the hydraulic cylinder can vary depending upon the magnitude of the needed depth change. Thus, the initial pulse in a sequence of adjustments may be and would normally be longer than those immediately following since the largest change is necessary when the needed change is first encountered. As the change begins to be handled, less change is detected and less adjustment is needed; consequently, the extent of the adjustment and the length of the pulse is progressively reduced.

Additionally, in the preferred embodiment, the value for the adjustment needed for each pulse is averaged over at least two successive pulses, including the value for the current variance from the set value and that for the immediately preceding variance so that changes or adjustments actually made by the hydraulic cylinder are less abrupt and are smoother than they otherwise would be. Still further, since making the adjustment of the frame necessarily requires a certain amount of time, the terrain sensor is placed slightly ahead of the coulters so as to sense the change in terrain slightly before the depth change is actually necessary for the coulters. Since the distance between the coulters and the terrain sensor will be traversed more quickly or less quickly depending upon the speed of travel of the implement, a provision is made in the preferred embodiment to responsively adjust the reaction time of the system to the terrain change depending upon the speed of the implement. In its preferred form, the system responds by slightly modifying the frequency of pulses generated by the system and proportionately changing the duration of each actuating pulse to maintain the same percentage duty cycle for the pulse. Preferably, the system is so established that as the ground speed increases the frequency of the pulses decreases so that the adjustments take place more smoothly. On the other hand, as the ground speed of the implement decreases, the frequency of the pulses increases so that the adjustments are carried out more smoothly.

These and other important objects of the invention will be made apparent from the following detailed description.

DETAILED DESCRIPTION

Figure 1:
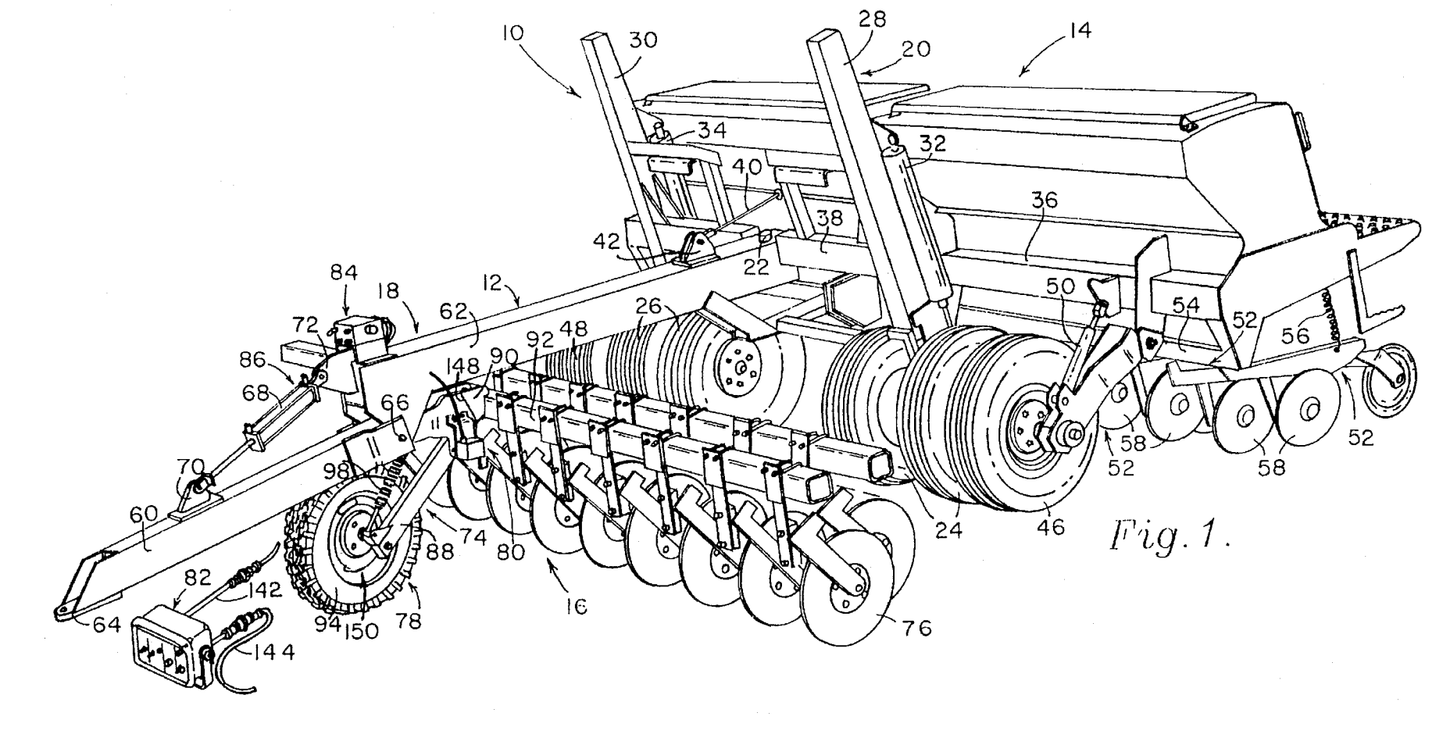
FIG. 1 is a left front perspective view of a grain drill rigged for no till or low till operation with a gang of coulter disks carried on a wheeled hitch for the drill, such implement employing a coulter depth control apparatus in accordance with the principles of the present invention.
Figure 2:
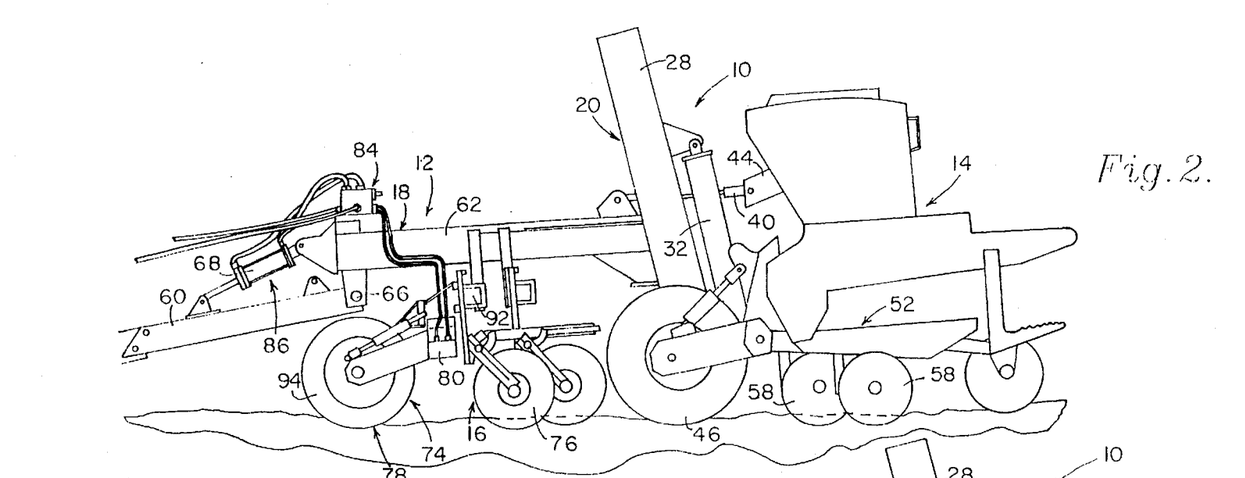
FIG. 2 is a schematic side elevational view thereof illustrating the terrain sensor wheel of the coulter depth control apparatus about to encounter a slight rise in the terrain.
Figure 3:
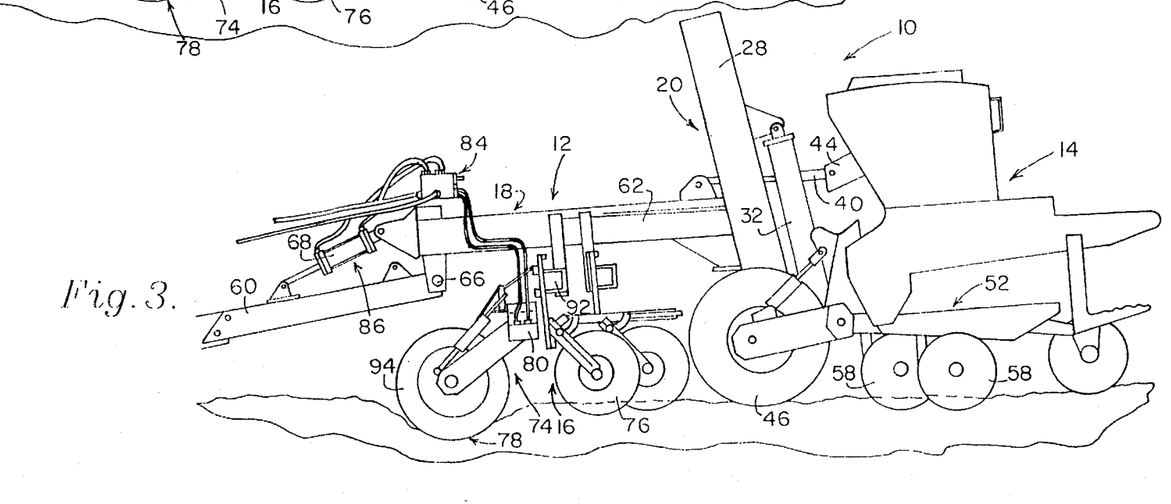
FIG. 3 is a schematic left side elevational view similar to FIG. 2 but illustrating the terrain sensor wheel as it might enter into a depression in the ground.

The implement 10 illustrated in FIGS. 1-3 comprises a wheeled hitch 12 and a drill 14 mounted on the rear end of the hitch 12. Generally speaking, the hitch 12 is in the nature of a wheeled frame that supports the drill 14 at its rear end and is adapted for attachment to a towing vehicle (not shown) at its front end. Various seed bed preparation devices, such as the gang of individually spring-loaded coulters 16, may be attached to the hitch 12 ahead of the drill 14 to prepare the drill for its seeding operations. In the illustrated embodiment, the hitch 12 is similar, with certain exceptions, to a hitch manufactured and sold under the trade designation "Center Pivot Hitch" by Great Plains Manufacturing, Incorporated, the assignee of the present application, while the drill 14 is a drill likewise manufactured and sold by Great Plains, under the trade designation "Solid Stand Drill". It will be appreciated that the hitch 12 and the drill 14 may take a variety of forms other than those illustrated herein without departing from the principles of the present invention.

The hitch frame 12 is generally T-shaped in top plan, having a fore-and-aft extending tongue beam 18 and a rear, transversely disposed generally rectangular, upright pivot frame 20 that is secured to the tongue beam 18 via an upright pivot 22. This permits a limited amount of pivoting action of the hitch 12 relative to the drill 14 as well understood by those skilled in the art. Two sets of dual wheels 24, 26 on opposite sides of the tongue beam 18 are located at the lower corners of the pivot frame 20 to support the hitch 12 for movement along the ground. The two sets of dual wheels 24, 26 are situated at the lower ends of a pair of upright, forwardly inclined, tubular beams 28 and 30 at opposite left and right ends of the pivot frame 20 which house structure for telescopically joining the wheels 24, 26 with the pivot frame 20. The rear end of the hitch frame 12 can thus be raised and lowered between transport and working positions by actuating lift cylinders 32 and 34 which lie alongside the uprights 28, 30 and are coupled with the transport wheels 24, 26.

The drill 14 is attached to the rear face of the pivot frame 20 by mounting structure (not illustrated) that includes a transverse beam 36 located behind and extending outwardly in opposite directions beyond a central, short, horizontal cross beam 38 of the pivot frame 20. The transverse beam 36 has appropriate mounting lugs (not shown) thereon for attaching the transverse beam 36 of the drill 14 to the cross beam 38 of the pivot frame 20, and a centrally disposed, for-and-aft extending stabilizer link 40 connects an upright lug 42 on the top surface of the tongue beam 18 with attachment lug 44 (FIGS. 2 and 3) on the drill 14.

A pair of left and right gage wheels 46 and 48 respectively are attached to opposite ends of the transverse beam 36 of the drill 14 so as to regulate the height of the drill 14 in the field working position as shown in FIGS. 1, 2 and 3. That working position may be adjusted via a turn buckle 50 for each gage wheel 46, 48 (only one turn buckle 50 being illustrated), it being understood that the hydraulic cylinders 32, 34 are used to elevate the entire rear end of the hitch 12 into a transport position (not illustrated) and thus lift the entire rear end of the hitch 12 with the drill 14 and its gage wheels 46, 48 off the ground for transport. When the cylinders 32, 34 are retracted to lower the drill 14 back into its working position, the gage wheels 46, 48 engage the ground and thus determine the working height of the drill unit 14.

It will be appreciated that the drill 14 has a series of many individuals openers 52 spaced across the path of travel of the machine, each of which openers 52 is pivotally connected to a lower transverse beam 54 for up and down swinging movement. Each opener 52 is biased yieldably downwardly by a pair of springs 56 that force a pair of double disks 58 or the like into the ground to prepare a generally transversely v-shaped seed slot for seeds dropping from the opener 52. Thus, although the gage wheels 46, 48 establish the working height of the drill 14, the openers 52 can individually pivot up and down relative to one another and to the gage wheels 46, 48 as may be necessary to accommodate seed bed conditions at the particular site of seed deposit represented by each individual set of double disks 58.

The tongue beam 18 has a front section 60 and a rear section 62, the front section 60 having a connector 64 at its front end for coupling the implement with a towing tractor, and the rear section 62 having the pivotal frame section 20 and drill 14 coupled therewith. The front and rear sections 60, 62 are pivotally interconnected by a transverse, horizontal pivot 66 so that the tongue beam 18 can buckle up and down about the pivot 66. A hydraulic piston and cylinder unit 68 interconnects an upstanding lug 70 on the front tongue section 60 with a forwardly projecting lug 72 on the rear tongue section 62 so as to control such buckling and unbuckling about the pivot 66. Extending the cylinder 68 causes the tongue beam 18 to buckle upwardly and incline the front and rear sections 60, 62 upwardly as the pivot 66 is elevated, thus raising the coulter gang 16. Retracting the cylinder 68 straightens and unbuckles the tongue beam 18 to lower the pivot 66 and likewise lower the coulter gang 16. It is to be understood that the gang of coulters 16 is rigidly fixed to the rear tongue section 62 so that as section 62 rises and falls, so does the coulter gang.

In accordance with the principles of the present invention, the implement 10 is provided with apparatus broadly denoted by the numeral 74 for maintaining a constant and consistent depth of penetration of the coulters of the gang 16 during field operations. It will be appreciated that the individual coulters themselves may take on a variety of different shapes, sizes, and mountings without departing from the principles of the present invention. Typically, such coulters will be of the wavy or fluted type so as to present corrugated, rather than smooth, bodies that open a tilled slit or slice somewhat wider than the thickness of the metal from which the coulter is made. These coulters 76 are aligned for-and-aft with corresponding sets of the double disks 58 back on the drill 14 so that the opened and tilled slice prepared by each coulter 76 is subsequently entered by a corresponding double disk opener 58 to provide a final shaping of the seed slot. As well known by those skilled in the art, seeds drop between the double disk openers 58 as the disks travel within the prepared seed slots to thus deposit the seeds below the upper surface of the soil, whereupon a variety of means may be used to cover or close the seed slots to complete the procedure.

In any event, the coulter depth control apparatus 74 of the present invention includes as one part thereof the hydraulic cylinder 68 which buckles and unbuckles the tongue beam 18 to raise and lower the coulter gang 16 as above described. Such actuation of the cylinder 68, however, comes only in response to terrain changes as they are detected by the apparatus 74, or by a manual override actuation by the driver of the tractor.

The control apparatus 74 further includes a terrain sensor 78 which detects changes in the terrain as the implement moves along, a terrain signal generating box 80 for generating signals that relate to the nature of the terrain encountered, and a microprocessor-based controller within a control box 82 that is adapted to be mounted near the tractor seat for observation and manipulation by the tractor driver. The controller of box 82 receives terrain signals from the terrain signal generator 80, compares them with a set value previously selected and established by the driver, and then commands the hydraulic cylinder 68 to make an adjustment if appropriate. Such commands are in the nature of electrical pulses supplied to an electrically responsive valve assembly 84 carried at the front end of the rear section 62 just above the lug 72. The electrohydraulic valve assembly 84 and the hydraulic cylinder 68 may, for convenience, be collectively thought of as an operating mechanism 86 for raising and lowering the hitch frame 12. This valve assembly 84 requires a constant flow of oil from either an open or closed centered hydraulic system. The controller of the box 82 may utilize a "RISC-like" central processing unit available from the Microchip Company of Chandler, Ariz. as a PIC 16 C54 chip.

Figure 5:
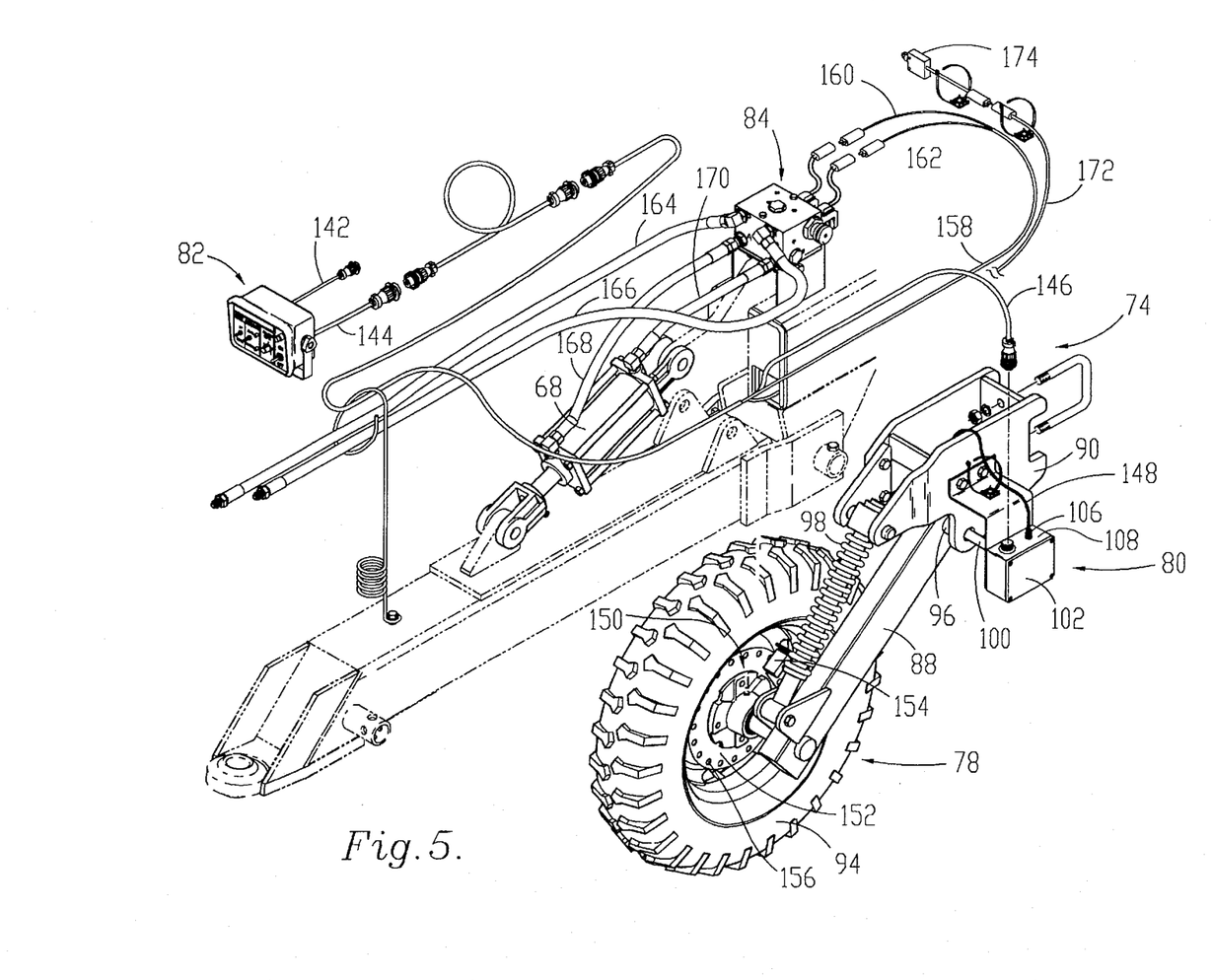
FIG. 5 is a fragmentary left front exploded view of the coulter depth control apparatus.

The terrain sensor 78, as shown generally in FIGS. 1–3 but in more detail in FIG. 5, includes an elongated, downwardly and forwardly extending arm member 88 that is pivotally supported at its upper rear end by a bracket 90 bolted to the front tool bar 92 of the coulter gang 16. The bracket 90 is positioned generally in the center of the machine, but just slightly to the right of the overhead rear tongue section 62 of the tongue beam 18. A free wheeling, ground engaging tire or wheel 94 is journaled on the lower end of the member 88 for rolling along the surface of the ground and for causing the arm 88 to swing up or down about its pivotal connection 96 (FIG. 5) with the bracket 90 as terrain changes are encountered. A spring assembly 98 connected between the lower end of the member 88 and a forwardedly extending projection of the bracket 90 yieldably biases the sensor wheel 94 toward the ground. The slightly rightwardly offset disposition of the arm 88 and the wheel 94 from the tongue sections 60, 62 permits the sensor wheel 94 to avoid engagement with the front tongue section 60 as the arm 88 swings up and down.

The sensor arm 88 has a horizontal spindle 100 (FIG. 5) fixed to its upper end in coaxial relation with the pivot 96 which projects laterally outwardly through the bracket 90 and into the backside of the terrain signal generator box 80. Inasmuch as the spindle 100 is fixed to the member 88, up and down movement of the arm 88 causes the spindle 100 to rotate to a corresponding extent about its longitudinal axis, which rotational movement has an effect upon the signals generated by the box 80.

Figures 6, 7:
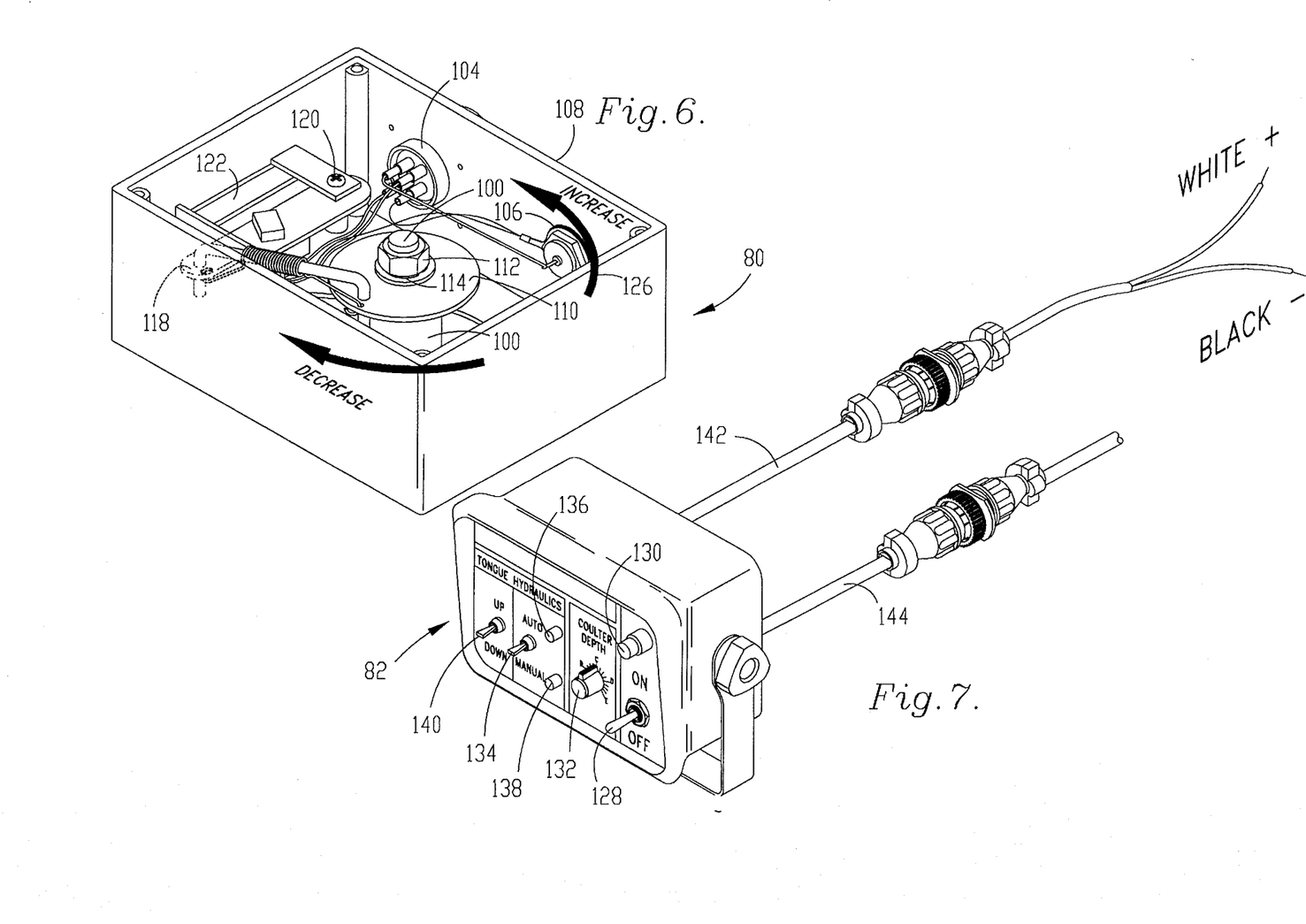
FIG. 6 is an enlarged, isometric view of the terrain signal generating box of the apparatus with the cover removed to reveal interior components.
FIG. 7 is an enlarged left front isometric view of the main control box of the apparatus which is normally mounted for easy access by the operator at the driver's seat of the tractor.

As seen in FIG. 5, the signal generator box 80 has a cover plate 102 and a pair of electrical inlets 104 and 106 in a top wall 108. As will hereinafter be described in more detail, the inlet 104 provides a point of connection for a lead from the main control box 82 of the apparatus 74, while the inlet 106 provides a point of connection for a lead from a ground speed sensor of the apparatus 74. FIG. 6 shows the terrain signal generating box 80 in an enlarged condition with the cover plate 102 removed and with the box 80 lying on its back. With reference to that figure, it is to be understood that the spindle 100 from the sensor arm 88 passes into the interior of the box 80 and has a crank disk 110 fixed thereto by a nut 112 and lock washer 114. An eccentrically disposed link 116 is connected between the disk 110 and the outer end of a flat lever 118 that is supported at its opposite end by a pivot 120 for swinging movement about an axis parallel to that of the spindle 100. A small, rectangular, angularly disposed magnet 121 on the flat lever 118 influences the voltage produced by a circuit board 122 in varying amounts, depending upon the position of the lever 118. Since the position of the lever 118 depends upon the rotative position of the disk 110 which in turn depends upon the up and down position of the sensor arm 88, changes in terrain sensed by the sensor wheel 94 result in corresponding changes in the voltage produced by the terrain signal generator box 80. One suitable device for performing the functions of the circuit board 122 and magnet 121 is available from Phillips Components, Discrete Products Division of Riviera Beach, Fla., as a "magnetic field sensor", part number KMZ10A1

As indicated by the large black arrows in FIG. 6, a clockwise rotation of the disk 110 as viewed in FIG. 6 results in a decrease in the voltage as indicated by arrow 124, while a counterclockwise rotation results in an increase in voltage, represented by the arrow 126.

The main control box 82 of the depth control apparatus 74 is shown generally in FIGS. 1 and 5, but more specifically in FIG. 7. It will be seen from FIG. 7 that the front face of the control box 82 has a toggle switch 128 which may be manipulated by the operator to turn the box 82 off or on. An indicator light 130 is illuminated when the system is turned on.

To the left of the toggle switch 128 is a selector knob 132 which the operator can twist into a selected rotative position to select the desired depth for the coulter gang 16. Various types of suitable indicia may be provided on the face of the box 82 corresponding to various depth selections. The knob 132 thus serves as data input means for the operator to establish a set or desired depth for the coulters.

To the left of the depth selector knob 132 is an automatic/manual toggle switch 134 which the operator can manipulate to set the depth control apparatus 74 for either automatic or manual operation. An indicator lamp 136 is illuminated when the system is in the automatic mode, while a second indicator lamp 138 is illuminated when the system is in the manual mode. When in the automatic mode, the system will automatically maintain the coulters running at the depth selected by the selector knob 132.

When the toggle switch 134 is flipped down to the manual mode, the tongue cylinder 68 may be extended or retracted by manually flipping another toggle 140 either up or down, the "up" position causing the cylinder 68 to extend and raise the coulters 16 as the tongue beam 18 is buckled, while the "down" position causes the cylinder 68 to retract and straighten or unbuckle the tongue beam 18 to lower the coulters 16.

The control box 82 has a power cord 142 which leads from the backside thereof. The power cord 142 should be connected across a 12-volt DC power source on the tractor to supply electrical power for the control system. A second cord or cable 144 also leads from the back of the control box 82 and is used to transmit various input and output signals and pulses between the control box 82, the terrain signal generator box 80, the electro-hydraulic valve assembly 84, and a transport lift sensor yet to be described. Referring back to FIGS. 5 and 6, it will be seen that the signal cable 144 includes a lead 146 that connects the control box 82 with the terrain signal generator box 80 via the electrical inlet 104 on the box 80. Generally speaking, voltage signals produced by the signal generating box 80 are transmitted to the main control box 82 via the lead 146 and signal cord 144 whereupon that information is processed and outputted to the electrohydraulic valve assembly 84.

The inlet 106 of the terrain signal box 80 receives a lead 148 that electrically connects the box 80 with a ground speed sensor 150 associated with the terrain sensor wheel 94. The speed sensor 150 includes a perforated disk 152 that is fixed to the sensor wheel 94 for rotation therewith, and a magnetic pickup 154 (FIG. 5). The pickup 154 reacts to the presence of the solid metal "lands" between the ring of perforations 156 to supply information to the signal generating box 80. Such speed signals are then transmitted to the main control box 82 where they are processed along with the signals from the terrain signal box 80. The speed sensor 150 may use a similar type of Phillips Components "magnetic field sensor" as the terrain signal box 80, but identified by Phillips part number KM110B/1.

As shown in FIG. 5, one lead 158 within the signal cable 144 electrically communicates the main control box B2 with the electro-hydraulic valve assembly 84. The lead 158 in turn comprises a pair of leads 160 and 162, one of which is used to provide "up" operating pulses to the valve assembly 84 and the other of which is used to provide "down" operating pulses to the valve assembly 84. One suitable valve assembly 84 containing a pair of electrically actuated solenoids (not shown) for actuating the double-acting hydraulic cylinder 68 is available from Delta Hydraulics of Rockford, Ill. as valve assembly part number 85006434. As shown in FIG. 5, a pair of hydraulic hoses 164 and 166 connect the valve assembly 84 with the tractor source of a constant flow of pressurized oil, while another pair of shorter hydraulic hoses 168 and 170 connect the valve assembly 84 with opposite ends of the hydraulic cylinder 68.

Figure 4:
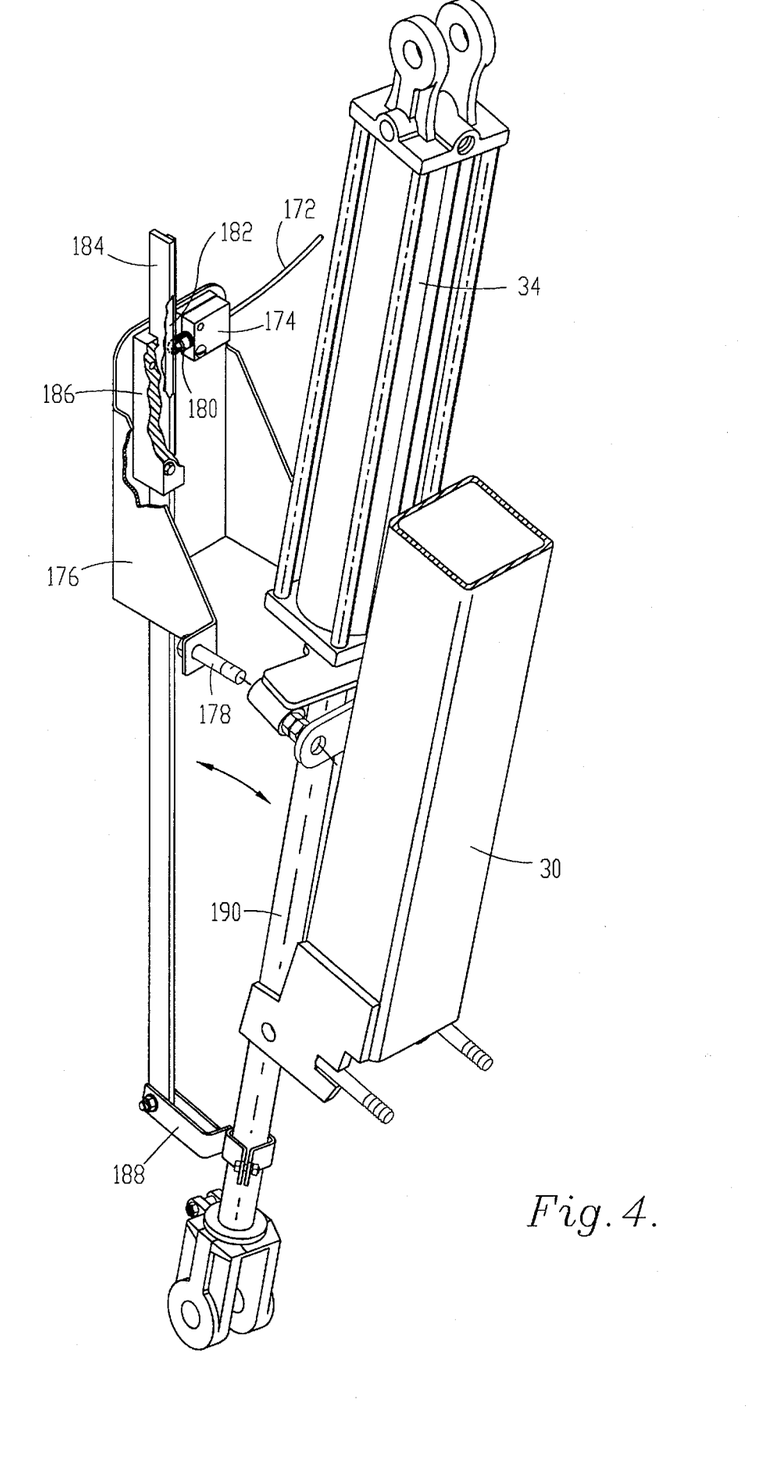
FIG. 4 is an enlarged, fragmentary isometric view of one of the lift cylinders for the transport wheels of the hitch implement, the components of such structure being illustrated in an exploded condition to reveal details of construction.

In the illustrated embodiment, the depth control apparatus 74 includes a provision for automatically extending the cylinder 68 to buckle the tongue beam 18 and thus raise the coulters 16 when the system is in the automatic mode and the transport cylinders 32, 34 are extended to lift the drill 14 up out of the ground, such as is necessary at the end of a field when turning around to realign the implement for the next pass across the field. Such provision includes a third lead 172 within the signal cable 144 which connects the main control box 82 with a plunger type switch 174. Such switch 174 is located back at the rear of the machine in association with the right transport cylinder 34 and the right tubular upright 30 as illustrated in FIG. 4. It will be seen in that figure that the switch 174 is fixed to the inside face of a generally U-shaped bracket 176 which is in turn fixedly secured to the cylinder 34 via bolts 178. The switch 174 has a depressible plunger 180 that bears against a cam ramp 182 secured to the inside face of an upright strap 184 that reciprocates vertically within a guide block 186 on the inside face of the bracket 176. At its lower end the strap 184 is fastened via a connector 188 to the lower end of the reciprocal rod 190 of cylinder 34 so that, as the rod 190 reciprocates during raising and lowering of the machine between its transport and working positions, the strap 84 likewise reciprocates and actuates the plunger 180. The cam ramp 182 is positioned adjacent the upper end of the strap 184 so that the plunger 180 of switch 174 is only depressed as the transport cylinders 32, 34 reach the limit of their extension corresponding to a fully raised position, which depression of plunger 180 signals the main control box 82 to command the valve assembly 84 to extend cylinder 68 and thus raise the coulters 16. When the transport cylinders 32, 34 are retracted to subsequently lower the machine back to the ground after the completion of the turnaround, the first action is to allow the plunger 180 of switch 174 to extend, thus retracting the tongue cylinder 68 and causing the coulters 16 to be lowered to their preset depth as determined by the selector knob 132 on the main control box 82. In the alternative, the buckling and unbuckling of the tongue beam 18 may be dispensed with during turnarounds since the geometry of the machine is such that when the transport cylinders 32, 34 are fully extended to lift the machine, the coulters 16 will also be carried into a ground clearing position. However, since the sensor wheel 94 has a range of travel that would cause it to continue to engage the ground even when the transport cylinders were fully extended, some provision must be made for raising the sensor wheel 94 if the tongue beam 18 is not to be buckled at this time. One option in this respect is to provide a small hydraulic cylinder (not shown) which may be actuated to raise the sensor wheel in response to extension of the transport cylinders. A sensor switch similar to the switch 174 could be used for this purpose if desired. An additional solenoid valve (not shown) controlled by the switch could be provided for denying fluid to the small cylinder until the proper time. Switch 174 must also interrupt the automatic mode of the controller when the auxiliary cylinder raises the sensor wheel. It would be important for the small auxiliary cylinder to not interfere with freedom of movement of the sensor wheel 94 during normal field operations, and such could be accomplished by connecting the cylinder with the wheel arm 88 via a suitable lost-motion connection such as a pin and slot arrangement (not shown).

Operation

The overall operation of the coulter depth control apparatus 74 should be apparent from the foregoing description. Nonetheless, a brief review of the operation will now be provided.

Upon entering the field and commencing operation, the operator supplies the oil flow to the electro-hydraulic valve 84. The driver then energizes the system by flipping the toggle switch 128 to the "on" position and selects the automatic mode with the toggle switch 134. The operator retracts the transport cylinders 32, 34 to lower the drill 14 to the ground. Typically, the transport wheels 24, 26 will thereupon be raised slightly off the ground so that the gage wheels 46, 48 establish the working position of the drill 14, but if necessary because of field conditions, the transport wheels 24, 26 can remain in engagement with the ground to bear some of the weight of the machine.

He then manipulates the selector knob 132 to program a set depth or desired depth of running for the coulters 16. The indicia associated with the selector knob 132 are not depth indicia per se but rather are preferably only relative indications of depth. In any event, lowering the drill 14 to the ground causes the plunger switch 174 associated with the transport cylinder 34 and upright 30 to be released, causing the cylinder 68 to be reacted and unbuckle the tongue beam 18 to lower the coulters 16 to the ground. The selected depth set by the control knob 132 on control box 82 determines how deeply the coulters will go into the ground at this point.

As the machine transverses the field and the coulters 16 slice through residue and soil to prepare a preliminary slice for the trailing openers 52, the terrain sensor wheel 94 rolls along the ground as illustrated in FIG. 2. On level ground the coulters 16 should run at the depth selected by the operator as the tongue cylinder 68 holds the tongue 18 in the appropriately buckled or straightened position to keep the coulters 16 where they belong. The voltage signals produced by the terrain signal generator box 80 should substantially match the set or desired voltage levels produced by the controller within the main control box 82, such that no changes in depth are necessary.

If the sensor wheel 94 begins to experience a rise in the terrain as illustrated in FIG. 2, the sensor arm 88 will swing upwardly from its "normal" position to some extent, causing the spindle 100 (FIG. 5) to rotate a corresponding amount within the terrain signal generator box 80. Thus, the voltage output from the terrain signal generator box 80 is changed, resulting in a difference in voltage when these signals are compared with the set values in the control box 82. If this difference exceeds a predetermined amount, which amount has been previously established within the software for the controller and may be referred to as the "dead zone", then an output pulse will be produced by the controller and will travel along the cable 144 to the valve assembly 84. This pulse will actuate the "up" solenoid within the valve assembly 84, causing the cylinder 68 to extend.

The duration of the pulse and the amount of extension of the cylinder 68 depends upon the magnitude of the voltage difference determined by the controller in the main control box 82. As the voltage difference increases due to the steepness of the rise being encountered by the sensor wheel 94, the magnitude of the voltage difference likewise increases and thus the length of the pulses correspondingly increases.

However, preferably, the pulse signals generated from the control box 82 are programmed to occur at periodic intervals ranging for example, from ¼ to ½ second apart, depending upon the ground speed of the machine as will hereinafter be explained. On the other hand, the duration of each actuating pulse depends upon the magnitude of the detected voltage difference and may range between a minimum of 0.165 seconds to a maximum generated pulse width that corresponds to the interval between successive generated pulses. Thus, if the variance between actual and desired depth has not been eliminated by the next generated pulse, the next generated pulse will start and the cylinder 68 will continue to extend and lift the coulters.

Preferably, the duration or width of each actuating pulse, but not the frequency, is based upon a computed average of the currently detected variance between the detected and desired values and that variance associated with the immediately preceding generated pulse. In that way, actuation of the cylinder 68 is less abrupt and is less jerky than would otherwise be the case. Furthermore, it will be noted that as the machine approaches the proper depth, the amount of variance between the actual depth and the desired depth decreases such that the duration of the actuating pulses progressively decreases to smooth out the operation of the system. Taking the average of the two variances further smooths out this action.

In the event that the sensor wheel 94 encounters a depression as illustrated in FIG. 3, the same type of action as previously described with respect to FIG. 2 occurs except that the "down" solenoid of the value 84 is actuated instead of the "up" solenoid. This causes the cylinder 68 to retract and straighten the tongue beam 18, causing a progressive lowering of the coulters 16 in readiness for the depression.

The ground speed sensor 150 has the effect of changing the frequency of the pulses generated by the controller in control box 82, and correspondingly adjusting the actuating pulse duration so that its duty cycle remains at the same percentage of the time interval between actuating pulses regardless of the ground speed. Thus, the higher the ground speed, the greater the time interval between successive generated pulses so that the pulses simply occur less frequently. Likewise, the slower the ground speed, the shorter the interval between generated pulses so that the pulses occur more frequently. This enables the operator to be assured during relative high speed travel that the necessary depth changes are indeed occurring because the operator can visually observe such generated pulses at slowed down intervals. On the other hand, when moving slowly, the operator can observe that the generated pulses are indeed occurring frequently enough inasmuch as the slow down is compensated for by causing the pulses to occur observably more frequently.

Of course, if the operator desires to adjust the depth setting for the coulters 16, he can do so quickly and conveniently from the tractor seat by merely turning the selector knob 132 in the appropriate direction and by the appropriate amount. Similarly, if he wishes to raise or lower the hitch frame manually for any reason, he need only flip the toggle switch 134 to the manual mode and operate the manual toggle switch 140 to either the up or down position as may be appropriate. Of course, upon reaching the end of the field, the operator extends the transport cylinders 32, 34 to raise the drill 14 off the ground, which simultaneously causes depression of the plunger switch 174 (FIG. 4) near the end of the stroke to buckle the tongue beam 18 and raise the coulters 16.

Figure 8A:
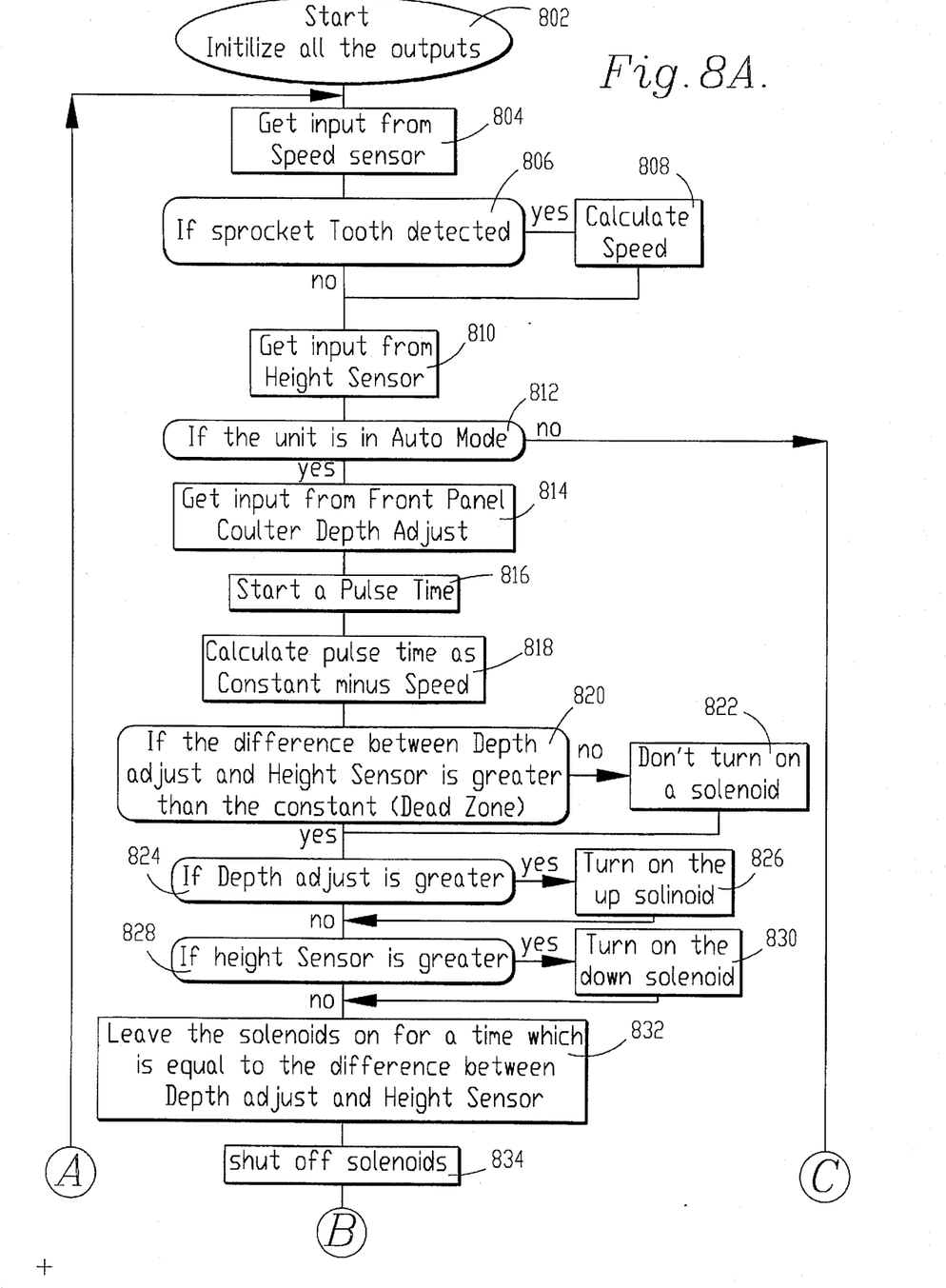
FIGS. 8a and 8b are a schematic flow chart of the steps followed by the controller of the system in maintaining constant coulter depth.
Figure 8B:
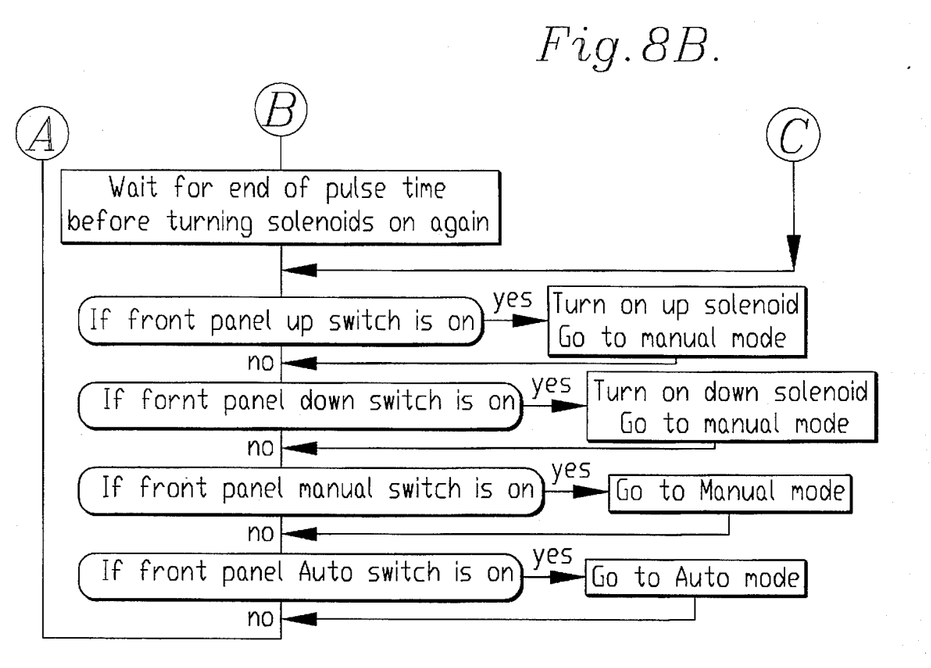

Referring to the flow chart of FIGS. 8a and 8b, major steps in the operation of the controller within the main control box 82 are illustrated. Once the outputs have all been initialized at step 802, the controller gets an input from the speed sensor 150 at step 804. If rotation of the sensor wheel 94 is detected because of the presentation of a solid land between a pair of the adjacent perforations 156 to the magnetic pickup 154, the controller at step 806 proceeds to calculate the ground speed at step 808. If no land is detected, the controller simply proceeds without calculating the speed to step 810 in which it receives the input from the terrain signal generator box 80.

The controller then checks at step 812 to determine whether the control box 82 is in the automatic or manual modes. If the unit is in the automatic mode, the controller proceeds to step 814 where it obtains an input from the data input means associated with the selector knob 132 on the front panel of the control box 82. Then at step 816, the controller determines a time interval between pulses, which time interval is increased or decreased at step 818 depending upon the input which was received from the speed sensor at 804.

At step 820 the controller determines the difference, if any, between the inputs received from the terrain signal generator 80 at step 810 and the desired or set value at step 814. If any such difference is not larger than a predetermined amount (referred to herein as the "dead zone"), the controller decides at step 822 to not turn on either solenoid of the valve assembly 84. On the other hand, if the difference does exceed the dead zone amount, the controller proceeds to step 824 where it determines whether the signal from the terrain signal generator 80 indicates a depression or a rise. If it indicates a rise, the controller proceeds to step 826 where it turns on the "up" solenoid of the valve assembly 84. On the other hand if the signal from terrain signal generator 80 indicates that a significant depression or drop has been encountered, as represented by step 828, the controller proceeds to turn on the "down" solenoid at step 830. Either way, the controller decides at step 832 to have the duration for the actuating pulse related to the magnitude of the difference between the desired depth and the actual indicated depth. When the actuating pulse time is completed, the controller shuts off the solenoids at step 834 and waits at step 836 for the beginning of the next pulse.

Back at step 812, if the controller had determined that the unit was not in the automatic mode, then steps 814 through 836 would be skipped. In either event, the next step 838 for the controller is to check to determine whether the toggle switch 140 on the front of the control box 82 is in the "up" or "down" position. If it is in the "up" position the controller at step 840 causes the "up" solenoid to be turned on and the system goes to the manual mode. If the front panel switch 140 is not in the "up" position, the controller at step 842 asks whether the switch is in the "down" position. If the answer to that question is "yes", the controller at step 844 turns on the "down" solenoid and the system goes to the manual mode.

The controller also asks at step 846 whether the switch 134 is in the manual mode. If the answer is "yes", the controller at step 848 goes to the manual mode, and if the answer is "no", the controller at step 850 asks whether the switch is in the automatic mode. If the answer to that question is "yes", the controller at step 852 goes to the automatic mode and if the answer is no, the controller loops back to the beginning of its routine to pick up a new set of signals.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intention to rely on the Doctrine of Equivalents to determine and assess the reasonably fair scope of their invention as pertains to any apparatus not materially departing from but outside the literal scope of the invention as set forth out in the following claims.

We claim:

1. In a farm implement having a frame, ground wheels supporting the frame for movement along the ground, and at least one ground-penetrating tool carried on the frame for movement therewith, apparatus for maintaining the tool at an essentially constant depth of penetration despite encountering changes in the terrain during said movement, said apparatus comprising:

a terrain sensor carried by the frame for detecting elevational changes in the terrain relative to the frame as the frame moves along the ground;

means operably connected with said sensor for generating terrain signals related to the terrain detected by the sensor;

operating mechanism operably coupled with the frame for raising or lowering the frame to adjust the depth of penetration of the tool; and a control system for adjustably actuating said mechanism when changes in the terrain would otherwise cause the tool to run either too deep or too shallow, said control system including data input means for permitting an operator of the implement to select a desired depth of penetration for the tool, said control system being operable to generate desired depth signals corresponding to the desired depth of penetration selected by the operator and to compare the desired depth signals with terrain signals received from said terrain signal generating means, said control system further including means for determining the difference, if any, between said desired depth signals and the terrain signals for producing actuating pulses to said operating mechanism in the event said difference exceeds a certain predetermined magnitude whereby to raise or lower the frame, depending upon whether the tool is too deep or too shallow, said control system further being operable to produce said actuating pulses at periodic intervals and for a time duration that is related to the magnitude of the difference between the terrain signals and the desired depth signals.

2. In a farm implement as claimed in claim 1, the time duration of said actuating pulses for the operating mechanism being based upon the computed average of the magnitude of the difference between at least the immediately preceding set of terrain and desired depth signals and the magnitude of the difference between the current set of terrain and desired depth signals.

3. In a farm implement as claimed in claim 2; and a speed sensor for detecting the speed of movement of the frame along the ground; and means operably connected with said speed sensor for generating speed signals relating to the speed detected by the speed sensor, said control system being operable to receive speed signals from the speed signal generating means and to responsively adjust the frequency of production of said actuating pulses.

4. In a farm implement as claimed in claim 3, said control system being operable to decrease the frequency of production of said actuating pulses as the speed of the frame along the ground increases, and to increase the frequency of production of said actuating pulses as the speed of the frame along the ground decreases.

5. In a farm implement as claimed in claim 2, said terrain signal generating means including means for generating an electrical potential, the magnitude of which is dependent upon the terrain detected by said terrain sensor, said control system including means for generating said desired depth signals in the form of an electrical potential, the magnitude of which is compared with the magnitude of the electrical potential of the terrain signals to determine the time duration of actuating pulses to the operating mechanism.

6. In a farm implement as claimed in claim 1; and a speed sensor for detecting the speed of movement of the frame along the ground; and means operably connected with said speed sensor for generating speed signals relating to the speed detected by the speed sensor, said control system being operable to receive speed signals from the speed signal generating means and to responsively adjust the frequency of production of said actuating pulses.

7. In a farm implement as claimed in claim 6, said control system being operable to decrease the frequency of production of said actuating pulses as the speed of the frame along the ground increases, and to increase the frequency of production of said actuating pulses as the speed of the frame along the ground decreases.

8. In a farm implement as claimed in claim 6, the time duration of said actuating pulse for the operating mechanism being based upon the computed average of the magnitude of the difference between at least the immediately preceding set of terrain and desired depth signals and the magnitude of the difference between the current set of terrain and desired depth signals.

9. In a farm implement as claimed in claim 1, said frame including a fore-and-aft extending pull tongue provided with a transverse, horizontal pivot between opposite front and rear ends thereof to present hingedly interconnected front and rear tongue sections, said operating mechanism including a hydraulic piston and cylinder assembly operably interconnecting said tongue sections for buckling the sections about said horizontal pivot when the mechanism is actuated for carrying out said raising or lowering of the frame.

10. In a farm implement as claimed in claim 9, said operating mechanism further including a control valve responsive to said actuating pulses from the control system to communicate said piston and cylinder assembly with a source of pressurized fluid.

11. In a farm implement as claimed in claim 1, said terrain sensor including a member mounted for up and down movement relative to said frame, said member having ground-engaging structure for causing the member to move up or down as rises or falls are encountered by said structure, said member being operably connected with said terrain signal generating means for generating such terrain signals in relation to the up or down position of said member.

12. In a farm implement as claimed in claim 11, said member having means at one end thereof pivotally coupling the member with said frame for carrying out said up and down movement as a swinging motion, said structure being disposed at an opposite end of said member remote from said pivotal coupling means.

13. In a farm implement as claimed in claim 11, said terrain signal generating means including means for generating an electrical potential, the magnitude of which is dependent upon the up or down position of said member.

14. In a farm implement as claimed in claim 13, said control system including means for generating said desired depth signals in the form of electrical potential, the magnitude of which is compared with the magnitude of the electrical potential of the terrain signals to determine the time duration of actuating pulses to the operating mechanism.

15. In a farm implement as claimed in claim 14, said speed sensor including a device for sensing the implement speed, said means for generating speed signals including means for generating an electrical potential which varies with the speed of said implement.

16. In a farm implement as claimed in claim 11, said ground engaging structure comprising a ground-driven wheel.

17. For use with a farm implement having a hydraulic cylinder which is operable when actuated to raise or lower at least one ground-penetrating tool of the implement, a control assembly connectable with the cylinder for adjustably maintaining the tool at an essentially constant depth of penetration during movement of the implement across the terrain, said control assembly including:

a terrain sensor for detecting elevational changes in the terrain relative to the implement as the implement moves along its path of travel;

means operably connected with said terrain sensor for generating terrain signals related to the terrain detected by the sensor; and a control system for adjustably actuating said cylinder when changes in the terrain would otherwise cause the tool to run either too deep or too shallow, said control system including data input means for permitting an operator of the implement to select a desired depth of penetration for the tool, said control system being operable to generate desired depth signals corresponding to the desired depth of penetration selected by the operator and to compare the desired depth signals with terrain signals received from said terrain signal generating means, said control system further including means for determining the difference, if any, between said desired depth signals and the terrain signals for producing actuating pulses in the event said difference exceeds a certain predetermined magnitude, said control system further including a valve responsive to said actuating pulses for operating the cylinder whereby to raise or lower the tool, depending upon whether the tool is too deep or too shallow, said control system further being operable to produce said actuating pulses at periodic intervals and for a time duration that is related to the magnitude of the difference between the terrain signals and the desired depth signals.

18. A control assembly as claimed in claim 17, the time duration of said actuating pulses being based upon the computed average of the magnitude of the difference between at least the immediately preceding set of terrain and desired depth signals and the magnitude of the difference between the current set of terrain and desired depth signals.

19. A control assembly as claimed in claim 18; and a speed sensor for detecting the speed of movement of the implement along the ground; and means operably connected with said speed sensor for generating speed signals relating to the speed detected by the speed sensor, said control system being operable to receive speed signals from the speed signal generating means and to responsively adjust the frequency of production of said actuating pulses.

20. A control assembly as claimed in claim 19, said control system being operable to decrease the frequency of production of said actuating pulses as the speed of the implement along the ground increases, and to increase the frequency of production of said actuating pulses as the speed of the implement along the ground decreases.

21. A control assembly as claimed in claim 18, said terrain signal generating means including means for generating an electrical potential, the magnitude of which is dependent upon the terrain detected by said terrain sensor, said control system including means for generating said desired depth signals in the form of an electrical potential, the magnitude of which is compared with the magnitude of the electrical potential of the terrain signals to determine the time duration of actuating pulses to the operating mechanism.

22. A control assembly as claimed in claim 17; and a speed sensor for detecting the speed of movement of the implement along the ground; and means operably connected with said speed sensor for generating speed signals relating to the speed detected by the speed sensor, said control system being operable to receive speed signals from the speed signal generating means and to responsively adjust the frequency of production of said actuating pulses.

23. A control assembly as claimed in claim 22, said control system being operable to decrease the frequency of production of said actuating pulses as the speed of the implement along the ground increases, and to increase the frequency of production of said actuating pulses as the speed of the implement along the ground decreases.

24. A control assembly as claimed in claim 22, the time duration of said actuating pulse being based upon the computed average of the magnitude of the difference between at least the immediately preceding set of terrain and desired depth signals and the magnitude of the difference between the current set of terrain and desired depth signals.

25. A control assembly as claimed in claim 17, said terrain sensor including a member mounted for up and down movement relative to said frame, said member having ground-engaging structure for causing the member to move up or down as rises or falls are encountered by said structure, said member being operably connected with said terrain signal generating means for generating such terrain signals in relation to the up or down position of said member.

26. A control assembly as claimed in claim 25, said member having means at one end thereof for pivotally coupling the member with the implement for carrying out said up and down movement as a swinging motion, said structure being disposed at an opposite end of said member remote from said pivotal coupling means.

27. A control assembly as claimed in claim 25, said terrain signal generating means including means for generating an electrical potential, the magnitude of which is dependent upon the up or down position of said member.

28. A control assembly as claimed in claim 27, said control system including means for generating said desired depth signals in the form of an electrical potential, the magnitude of which is compared with the magnitude of the electrical potential of the terrain signals to determine the time duration of actuating pulses.

29. A control assembly as claimed in claim 25, said ground engaging structure comprising a ground-driven wheel.

30. A control assembly as claimed in claim 29, said speed sensor including a device for sensing the rotational speed of said ground-driven wheel, said means for generating speed signals including means for generating an electrical potential which varies with the rotational speed of said ground-driven wheel.

* * * * *